Dec. 25, 1962  R. A. POTTER  3,070,392
CONNECTING ROD ASSEMBLY
Filed May 11, 1961
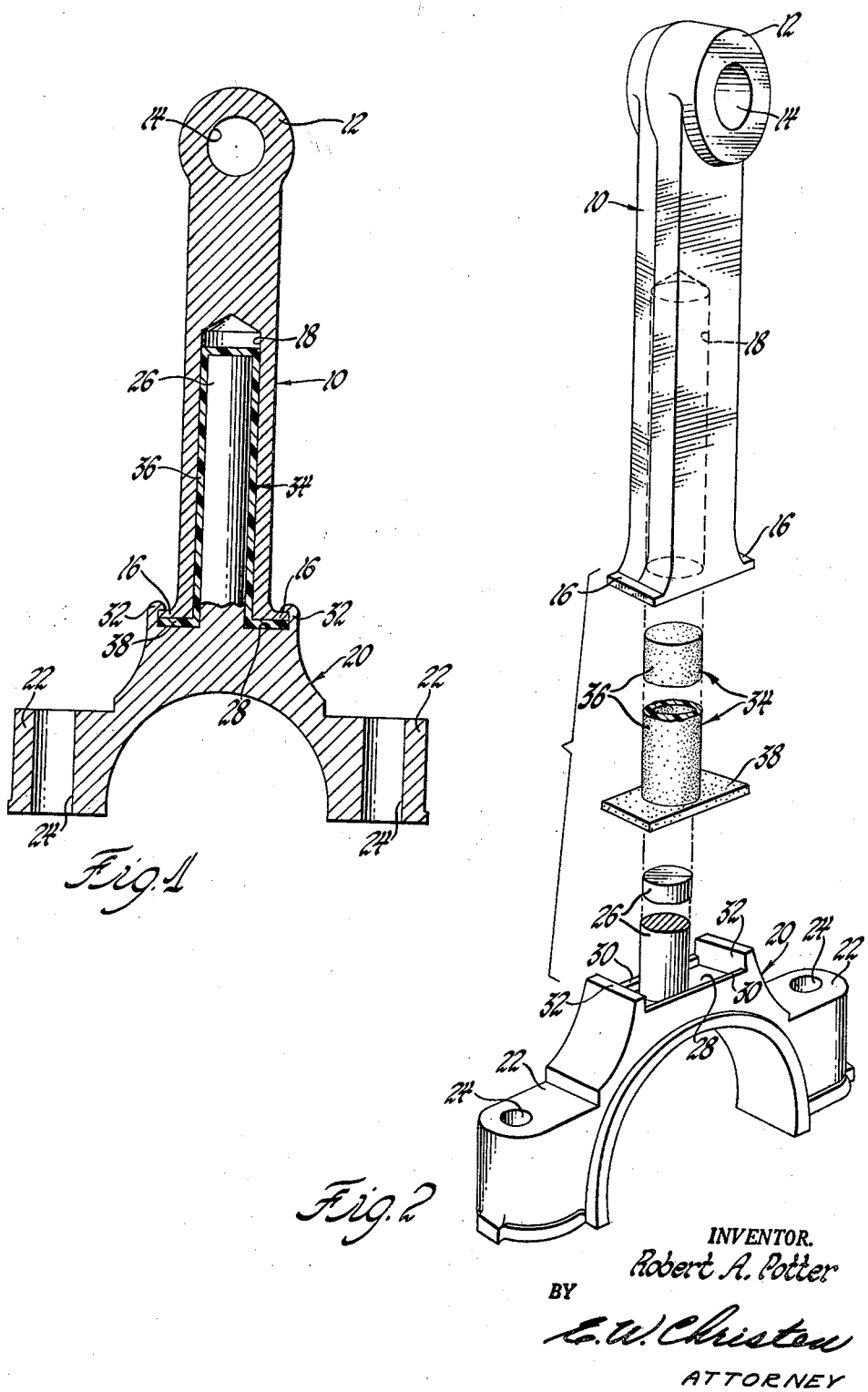
INVENTOR.
Robert A. Potter
BY
C. W. Christen
ATTORNEY

United States Patent Office 3,070,392
Patented Dec. 25, 1962

---

3,070,392
CONNECTING ROD ASSEMBLY
Robert A. Potter, Warren, Mich., assignor to General Motors Corporation, Detroit, Mich., a corporation of Delaware
Filed May 11, 1961, Ser. No. 109,400
2 Claims. (Cl. 287—119)

This invention relates to a connecting rod assembly for an engine, and more particularly to a damped, vibration absorbing connecting rod assembly.

In the design and manufacture of internal combustion engines a piston is usually provided which is connected to a crankshaft by means of a connecting rod device. During the operation of the engine there are considerable force pulses transmitted from the piston to the crankshaft through the connecting rod, particularly upon the explosion of the gaseous charge in the cylinder which drives the piston. This pulse transmission results in vibration and noise in the engine. Devices have been designed in the past to aid in eliminating the vibration and noise caused by force transmission and include the use of resilient members forming structural parts of the connecting rod assembly or the use of flexible materials somewhere in the assembly. Most of these have resulted in complicated, expensive devices which are difficult to manufacture and assemble, and which may not fully accomplish the job for which they were designed.

The device in which this invention is embodied comprises, generally, a connecting rod assembly which is in two parts, the parts being separated by a resilient damping material to take up the vibrations and cushion the force pulse transmission. Not only are axial forces cushioned, but side forces are also damped. The structure results in an economical and uncomplicated design which is relatively simple to manufacture and assemble and provides the required strength.

These and other advantages will become more apparent from the following description and drawing, in which:

FIGURE 1 is a cross-sectional view of the connecting rod embodying this invention, illustrating the various parts; and FIGURE 2 is an exploded view of the connecting rod assembly of FIGURE 1 with parts broken away and in section to illustrate the construction.

Referring more particularly to the drawing, the complete connecting rod assembly is best shown in FIGURE 1. An upper rod portion, indicated generally by the numeral 10, is shown to be an elongated member, terminating at its upper end in an enlargement or boss 12. A cylindrical aperture 14 is formed in the boss 12 and serves as a means for connecting the connecting rod assembly to the piston, not shown. In the usual construction of piston and connecting rod assemblies a wrist pin or pivot pin is used.

The lower end of the upper rod portion 10 is provided with flanges 16 extending from opposite sides of the body and for purposes to be later described. Within the upper rod portion 10 is a bore 18 extending axially and part way through the upper rod portion 10. Bore 18 may be of convenient cross-sectional configuration. For purposes of illustration, this bore is shown to be cylindrical.

A lower rod portion, indicated generally by the numeral 20, serves as a connecting means to the usual engine crankshaft, not shown, by means of bolt ears 22 having bolt hols 24 formed therein. A conventional mating part would be provided in order to clamp the connecting rod assembly to the crankshaft in the usual manner. Lower rod portion 20 is provided with an extension 26 extending axially from the lower rod portion 20 and receivable in the bore 18 formed in the upper rod portion 10. At the base of the extension 26 is a recess 28 defined by side walls 30 of the lower rod portion 20 and end flanges 32 which project in the same general direction as the extension 26.

A resilient member, illustrated generally by the numeral 34, is received over the extension 26 and within the bore 18. Resilient member 34 has a sleeve portion 36 and a flange 38 which has substantially the same configuration as the recess 28 formed in the lower rod member 20. The resilient member 34 may be bonded to the extension 26 and to the upper rod portion 10 within the bore 18. Resilient member 34 may be of any suitable damping material, such as rubber, plastic or a viscoelastic material.

Upon assembly of the various parts forming the connecting rod structure, the resilient member 34 is first disposed over the extension 26 formed from the lower rod portion 20. The upper rod portion 10 is then placed over the resilient material 34 and extension 26, and the flanges 16 placed in the recess 28 above the flange 38 formed on the end of the resilient member 34. Recess 28 serves to locate and position the upper rod portion 10 with respect to the lower rod portion 20. Flanges 32 may then be crimped or clinched in any suitable manner over the flanges 16 or the upper rod portion 10. The resilient member 34 may then be bonded to both the extension 26 and the upper rod portion 34 in any suitable manner.

During operation of the engine, resilient member 34 serves to cushion the force pulses transmitted from upper rod portion 10 to lower rod portion 20. Since the member 34 is bonded to both portions, some of the cushioning effect will be taken in shear in the sleeve 34. Further, compression of flange 38 will aid in cushioning the pulses. Forces in the opposite direction may also be cushioned due to the inertia of the piston and upper rod portion 20, the same shear and compression forces being utilized.

It is seen that a complete connecting rod assembly is provided which will damp the vibrations transmitted from the piston to the crankshaft of the engine through the normal connecting rod assembly. Likewise, the forces exerted by the piston will be cushioned by the parts of the resilient material, thus assisting in the vibration and noise damping and elimination. It is easily seen that the construction is uncomplicated and may be easily manufactured and assembled.

What is claimed is:

1. A connecting rod assembly for use in an engine having a piston and a crankshaft and comprising an upper rod portion adapted to be secured to the piston and having an axial opening formed therein, a lower rod portion having an extension formed axially therefrom, said extension extending into said opening in said upper rod portion, vibration damping material bonded to said extension and to said upper rod portion within said opening, and means for securing said upper rod portion to said lower rod portion, said vibration damping material being adapted to cushion the forces transmitted from said piston to said crankshaft through said connecting rod assembly.

2. A connecting rod assembly for use in an engine having a piston and a crankshaft and comprising an upper rod portion adapted to be secured to said piston and having an axial bore formed therein, an outwardly extending flange formed from the base of said upper rod portion, a lower rod portion having an axial extension formed therefrom and extending into said bore in said upper rod portion, said lower rod portion having a recess formed therein at the base of said extension and receiving said flange on said upper rod portion, a resilient material bonded to said extension and to said upper rod portion within said bore, and means on said lower rod portion for securing said upper rod portion in said recess, said resilient material being adapted to cushion the forces transmitted from said piston to said crankshaft through said connecting rod assembly.

References Cited in the file of this patent

UNITED STATES PATENTS 2,041,704   Gordon et al. _____ May 26, 1936